(12) United States Patent
Spiegel et al.

(10) Patent No.: US 10,384,524 B2
(45) Date of Patent: Aug. 20, 2019

(54) DRIVE TRAIN OF A MOTOR VEHICLE THAT CAN BE DRIVEN IN A PURELY ELECTRIC MANNER

(71) Applicant: Dr. Ing. h.c. F. Porsche Aktiengesellschaft, Stuttgart (DE)

(72) Inventors: Leo Spiegel, Vaihingen/Enz (DE); Daniel Knoblauch, Obergruppenbach (DE); Johannes Lange, Wiernsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 281 days.

(21) Appl. No.: 14/064,273

(22) Filed: Oct. 28, 2013

(65) Prior Publication Data

US 2014/0116201 A1 May 1, 2014

(30) Foreign Application Priority Data

Oct. 26, 2012 (DE) .................. 10 2012 110 269

(51) Int. Cl.
*B60K 1/02* (2006.01)
*B60K 1/00* (2006.01)
(Continued)

(52) U.S. Cl.
CPC .............. *B60K 1/02* (2013.01); *B60K 1/00* (2013.01); *B60L 15/2036* (2013.01);
(Continued)

(58) Field of Classification Search
CPC ... B60K 1/00; B60K 1/02; B60K 7/00; B60K 7/0007; B60K 2007/0061; B60K 8/00;
(Continued)

(56) References Cited

U.S. PATENT DOCUMENTS 7,600,448 B2 * 10/2009 Yang ................. B60K 6/387
74/664
8,056,662 B2 * 11/2011 Schoon ................ B60K 1/02
180/245

(Continued)

FOREIGN PATENT DOCUMENTS

CN 101519040 A 9/2009
DE 19954544 B4 5/2004
(Continued)

OTHER PUBLICATIONS

English translation of CN 101519040.*
Chinese Office Action dated Oct. 12, 2015.

*Primary Examiner* — Victor L MacArthur
*Assistant Examiner* — Bobby Rushing, Jr.
(74) *Attorney, Agent, or Firm* — Gerald E. Hespos; Michael J. Porco; Matthew J. Hespos

(57) ABSTRACT

A drive train (6) is provided for a motor vehicle which can be driven in a purely electric manner. A gear mechanism (7, 15) has a standardized housing (8) for accommodating an electrical machine (16) or two electrical machines (10, 11) and for accommodating two gear mechanism output shafts (9) which are associated with a vehicle axle (2, 4). A large number of drive topologies for various vehicle sectors with purely electric drives can be formed by configuring the drive train in this way.

14 Claims, 4 Drawing Sheets

(51) Int. Cl.
B60L 15/20 (2006.01)
B60L 50/51 (2019.01)
*F16H 57/033* (2012.01)

(52) U.S. Cl.
CPC ........... B60L 15/2054 (2013.01); B60L 50/51 (2019.02); *B60L 2220/12* (2013.01); *B60L 2220/14* (2013.01); *B60L 2220/42* (2013.01); *B60L 2240/12* (2013.01); *B60L 2240/421* (2013.01); *B60L 2240/423* (2013.01); *B60L 2260/28* (2013.01); *B60Y 2304/05* (2013.01); *B60Y 2304/076* (2013.01); *B60Y 2304/078* (2013.01); *B60Y 2410/10* (2013.01); *F16H 2057/0335* (2013.01); *Y02T 10/645* (2013.01); *Y02T 10/646* (2013.01); *Y02T 10/7005* (2013.01); *Y02T 10/72* (2013.01); *Y02T 10/7275* (2013.01); *Y10T 74/19014* (2015.01)

(58) Field of Classification Search
CPC .... B60K 2057/02034; B60K 2001/001; B60K 2001/006
USPC ............................ 74/661, 664, 665 R, 665 H
See application file for complete search history.

(56) References Cited

U.S. PATENT DOCUMENTS

| | | | | |
|---|---|---|---|---|
| 8,448,542 B2 * | 5/2013 | Nagamori | ............... | B60K 6/46 477/3 |
| 8,739,655 B2 * | 6/2014 | Bologna | ................. | B60K 1/04 74/661 |
| 8,857,554 B1 * | 10/2014 | Keller | .................... | B60K 17/30 180/253 |
| 8,998,765 B2 * | 4/2015 | Sten | ........................ | F16H 48/36 475/150 |
| 9,457,658 B2 * | 10/2016 | Knoblauch | ............... | B60K 1/02 |
| 2008/0058149 A1 | 3/2008 | Yang | | |
| 2011/0259657 A1 | 10/2011 | Fuechtner | | |
| 2011/0312460 A1 * | 12/2011 | Nett | ....................... | B60K 6/442 475/5 |
| 2018/0013338 A1 * | 1/2018 | Gassmann | ............... | B60K 1/00 |

FOREIGN PATENT DOCUMENTS

| | | | | | |
|---|---|---|---|---|---|
| DE | 102009013875 | | 9/2010 | | |
| DE | 202009014490 | * | 3/2011 | ............... | B60L 3/00 |
| DE | 102011001481 | | 6/2012 | | |
| DE | 102011056048 A1 * | | 6/2013 | ............... | B60K 1/02 |
| FR | 2983787 A1 * | | 6/2013 | ............... | B60K 1/02 |
| JP | H05193511 | | 8/1993 | | |
| JP | 6-18156 | * | 3/1994 | ............ | B62D 21/00 |
| JP | H0618156 | | 3/1994 | | |
| JP | H06219168 | | 8/1994 | | |
| JP | H08168208 | | 6/1996 | | |
| JP | 2007137099 | | 6/2007 | | |
| KR | 20070120631 | | 12/2007 | | |
| WO | WO-2011083680 A1 * | | 7/2011 | ............... | B60K 1/04 |

* cited by examiner

DRIVE TRAIN OF A MOTOR VEHICLE THAT CAN BE DRIVEN IN A PURELY ELECTRIC MANNER

CROSS REFERENCE TO RELATED APPLICATION

This application claims priority under 35 USC 119 to German Patent Appl. No. 10 2012 110 269.4 filed on Oct. 26, 2012, the entire disclosure of which is incorporated herein by reference.

BACKGROUND

1. Field of the Invention

The invention relates to a drive train of a vehicle which can be driven in a purely electric manner.

2. Description of the Related Art

Motor vehicles can be categorized in different sectors. For example, the sectors for passenger cars include the small car sector, the mid-range sector and the luxury sector. Sports cars are represented in the mid-range sector and in the luxury sector. The mid-range sector and the luxury sector are of particular importance with respect to the present invention.

Drive trains with differently configured gear mechanisms are used for the different sectors. More particularly, different connection dimensions of one or more electrical machines in the vehicle affect the possible configurations of the gear mechanisms for the drive train. The connection dimensions must be considered in terms of the electrical machine/gear mechanism interface. The different connection dimensions are required due to the use of different sizes of electrical machine and types of electrical machine for power and function adjustment.

The object of the present invention is to provide a drive train that allows for a large number of drive topologies for different vehicle sectors with purely electric drives.

SUMMARY OF THE INVENTION

The invention relates to a drive train of a motor vehicle that can be driven in a purely electric manner. The drive train has a gear mechanism with a standardized housing for accommodating an electrical machine or two electrical machines and for accommodating two gear mechanism output shafts that are associated with a vehicle axle.

The standardized housing is configured in an unchanging manner for a large number of different variants of drive trains of motor vehicles that can be driven in a purely electric manner. The gear mechanism housing is used for motor vehicles in the mid-range sector and the luxury sector, including for sports cars.

The housing of the gear mechanism has two receptacles for electrical machines, and an electrical machine may be arranged in the region of each receptacle in accordance with the configuration of the drive train. Therefore two electrical machines may be provided in the drive train. However, only one of the two receptacles interacts with an electrical machine if the drive train has only one electrical machine. In this case, the housing of the gear mechanism is closed by a gear mechanism cover or the like in the region of the receptacle that is not used in the manner of fastening the electrical machine.

The receptacles in the housing preferably are of identical design. As a result, the receptacles have matching configurations for the connections of the respective electrical machines and any desired electrical machine can be connected to the housing in the region of this receptacle. In the simplest way, the housing has two identical accommodation flanges for connection to bearing flanges of the electrical machine or to the gear mechanism cover.

The housing of the gear mechanism further accommodates two gear mechanism output shafts that are associated with a vehicle axle of the motor vehicle. This axle may be the rear axle or the front axle of the motor vehicle.

The gear mechanism as such, therefore as viewed in terms of the functionality of torque transmission, can be of different configuration.

The gear mechanism may be in the form of a summing gear mechanism. Therefore, when two electrical machines are associated with the gear mechanism, two torques are introduced into the gear mechanism by the electrical machines and are transmitted to the two gear mechanism output shafts in summed form.

As an alternative, the gear mechanism can have first and second separate gear mechanism units and first and second gear mechanism outputs, each of which provides a single-wheel drive of the road wheels of the vehicle axle. The separate gear mechanism units are independently active. The single-wheel drive causes torque to flow from the first of the electrical machines, via the first gear mechanism unit, to a first wheel of the single-wheel drive, and the other force flows from the second electrical machine, via the second gear mechanism unit, to the second wheel of this vehicle axle. In this configuration, identical electrical machines to be connected to the gear mechanism units.

A summing gear mechanism can be connected to an electrical machine of high power, to two electrical machines of low power, or to an electrical machine of high power and an electrical machine of low power.

The modular approach for the drive train of the invention enables a relatively low number of drive components to targeted in a manner to achieve a large number of drive topologies for different vehicle sectors having electric drives. Both the power and the functionality can be provided in accordance with the vehicle sector.

An identical base gear mechanism preferably is used. In particular the summing gear mechanism may be used for a single-motor drive unit with a large electrical machine or a two-motor drive unit with small electrical machines. Identical machine connection dimensions, therefore an identical machine/gear mechanism interface, allow the use of different sizes of machine and types of machine for power and function adjustment. The number of machines and distribution of the machines in the vehicle can be varied for power adjustment, power distribution, expansion of functions, and an increase in efficiency by characteristic-map-optimized operation.

The type of machine also can be modified. For example, an electrical machine in the form of an asynchronous machine, or an electrical machine in the form of a permanent-magnet synchronous machine can be used. This variation in the type of machine is advantageous in terms of the cost adjustment, the increase in efficiency by machine-type-optimized operation and the power adjustment for the drive topologies.

A rotor shaft of the respective electrical machine preferably is transverse to the forward direction of travel of the motor vehicle. A corresponding orientation also is advantageous for the respective gear mechanism output shaft.

To optimize the installation space of the drive train, the gear mechanism preferably is in the central region of the motor vehicle, with respect to the width extent of the motor vehicle. As a result, articulated shafts between the gear mechanism and the road wheels of the respective vehicle axle can be relatively long, with a corresponding advantage for the bending angle. When the drive train has two electrical machines, the gear mechanism preferably is arranged between the electrical machines.

When the drive train has two electrical machines, one electrical machine preferably is an asynchronous machine and the other electrical machine is a permanent-magnet synchronous machine. Combining these different types of electrical machines produces advantages in terms of the degree of efficiency. For example, a changeover can be made between these two types of electrical machine as a function of the speed or load range. It is possible to switch off or decouple the machine.

The gear mechanism preferably is a two-stage gear mechanism. In this case, the gear mechanism may be of three-shaft design with an intermediate shaft, or may be a gear mechanism with a first stage of planetary design and a second stage of spur-gear design. A two-stage gear mechanism of this kind has a high degree of efficiency together with low costs. A compact gear mechanism can be formed, in particular in the center of the vehicle. The output drive can be performed from the center region of the vehicle so that long drive shafts with small bending angles can be formed. An efficient tooth system can be created by two gear wheel stages. Additionally, provision at least one electrical machine optionally can be decoupled by a decoupling device. Immersion lubrication preferably is provided in the gear mechanism, and therefore an oil pump is not required. The gear mechanism output may have an associated mechanical differential, except in the case of the single-wheel drive.

Further features of the invention can be found in the appended drawing and the description of the preferred exemplary embodiments which are shown in the drawing, without being restricted to the exemplary embodiments.

DETAILED DESCRIPTION OF THE PREFERRED EMBODIMENTS

Figure 1:
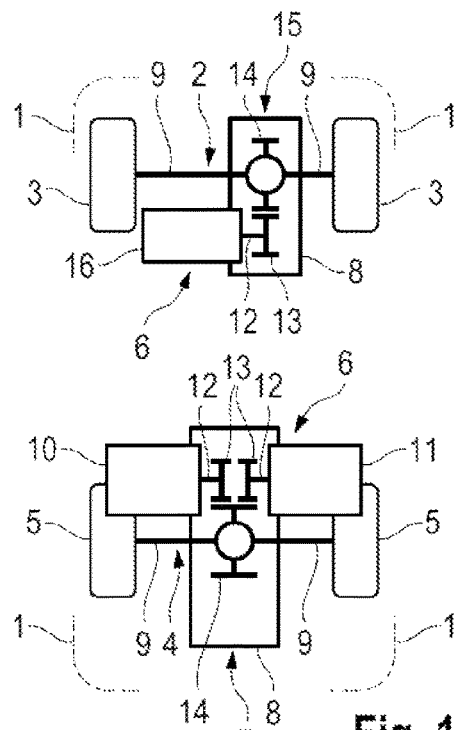
FIGS. 1 to 7 show drive trains for a front and a rear axle of a motor vehicle, illustrated for drive topologies.

FIG. 1 is a schematic plan view of a motor vehicle, such as a passenger car, with the outer corner contour of the motor vehicle which illustrated by the four curved line sections 1. Two front wheels are associated with a front axle 2 of the motor vehicle, and two rear wheels 5 are associated with a rear axle 4 of the motor vehicle. The front axle 2 forms a constituent part of an independent drive train 6, and the rear axle 4 forms a constituent part of an independent drive train 6. The drive trains 6 are of different configurations, and the design thereof is described in greater detail below.

A gear mechanism 7 has a gear mechanism housing 8 and is associated with the rear axle 4. The gear mechanism housing 8 is a standardized housing. It is therefore of identical design for all the drive topologies that are discussed below. The housing 8 accommodates an electrical machine or two electrical machines and two gear mechanism output shafts 9 that are associated with the rear axle 4 and the rear wheels 5. Specifically, the housing 8 accommodates two electrical machines 10 and 11 that are flange-connected on sides of the housing 8 that are averted from one another and the gear mechanism 7 is arranged between the two electrical machines 10 and 11. Output shafts 12 of the electrical machines 10 and 11 have pinions 13 that mesh with a gear wheel 14 of the gear mechanism 7. Thus, the gear mechanism 7 is a summing gear mechanism. As an alternative, the output shafts 12 of the electrical machines 10 and 11 are fixed to a gear mechanism input shaft that has a pinion 13 meshed with the gear wheel 14 of the gear mechanism 7. In addition, it is possible, in both cases, for an intermediate shaft to also be arranged between the pinion 13 and the gear wheel 14 to form a required transmission ratio.

The drive train 6 of the front axle 2 of the motor vehicle has an associated gear mechanism 15 with a housing 8 that corresponds to the housing 8 of the gear mechanism 7 so that the kinematics of this gear mechanism 15 are modified. For example, only one electrical machine 16 is connected to the bearing flange of the housing 8, and the bearing flange on the other side of the housing 8 remains free for another electrical machine. Thus, the housing 8 is closed in this region by a cover. The output shaft 12 of the electrical machine 16 is connected to a pinion 13 that meshes with a gear wheel 14 that can be narrower than the gear wheel 14 provided for the rear axle 4.

The two electrical machines 10 and 11 of the rear axle 4 can be identical or different. The electrical machine 16 of the front axle 2 can be identical to or different from the electrical machines 10, 11 of the rear axle 4.

This drive concept described in FIG. 1 preferably is used in the mid-range sector, in particular in sports cars.

In the description of the following figures, parts of the respective drive train 6 that correspond to those of FIG. 1 with respect to structure or functionality are provided with the same reference numerals for the sake of simplicity.

Figure 2:
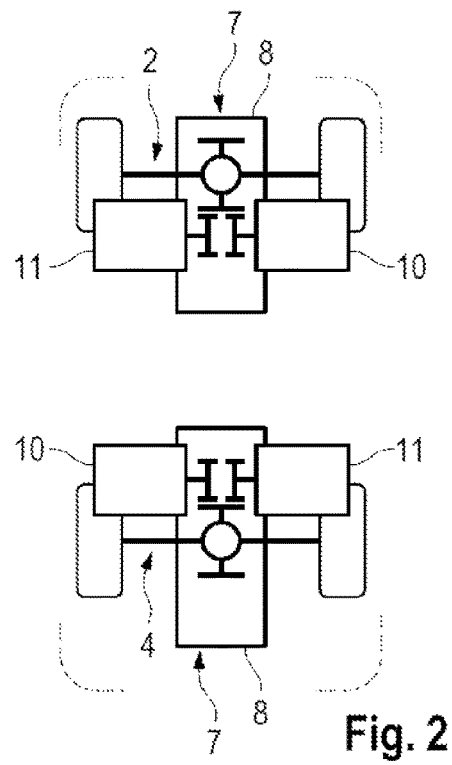

The FIG. 2 version of the motor vehicle, which likewise is used in the mid-range sector and/or in sports cars, differs from FIG. 1 only in that the rear drive train 6 of FIG. 1 is implemented for both the rear axle 4 and the front axle 2 in FIG. 2. In this respect, the front axle 2 is driven by the two electrical machines 10 and 11.

Figure 3:
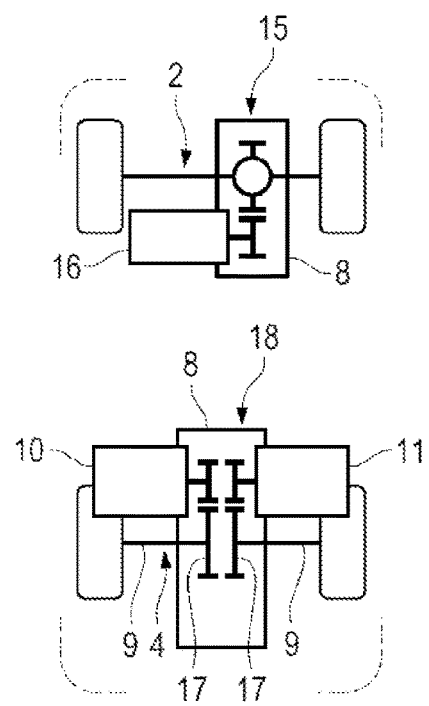

The drive concept of FIG. 3 is used in the luxury sector and/or in sports cars in that sector and differs from FIG. 1 in that a gear mechanism 18 with a housing 8 that allows a single-wheel drive is used for the rear axle 4. Therefore, the rear axle 4 of the embodiment in FIG. 3 has electrical machines 10 and 11 with two pinions 13 that engage separate gear wheels 16, 17, and the gear wheel 17 is connected to a gear mechanism output shaft 9. The gear mechanism 18 therefore has two component gear mechanisms.

Figure 4:
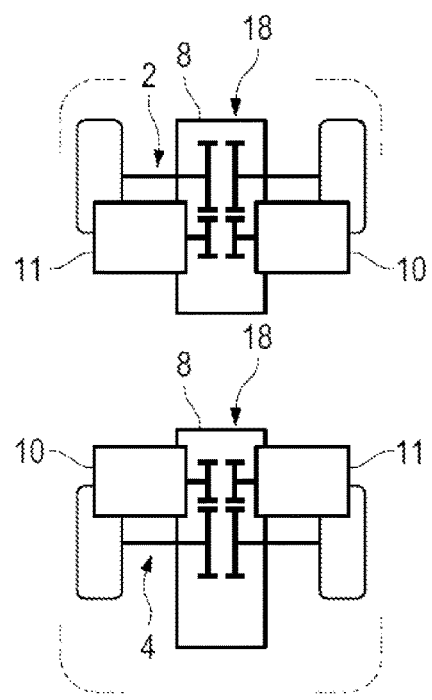

The refinement of the drive train of FIG. 4 also is used in the luxury sector and in sports cars in that sector. In this case, both the front axle 2 and the rear axle 4 have the single-wheel drive with the gear mechanism 18 described in FIG. 3. Accordingly, four electrical machines 10, 11 are provided in this vehicle.

The same housing 8 is used in the embodiment of FIGS. 3 and 4. On the basis of the variants of FIGS. 1 to 4, an increase in functionality and/or power in drive concepts of the respective motor vehicle that can be driven in a purely electric manner can be formed by choosing the number of electrical machines and the type of machine.

Figure 5:
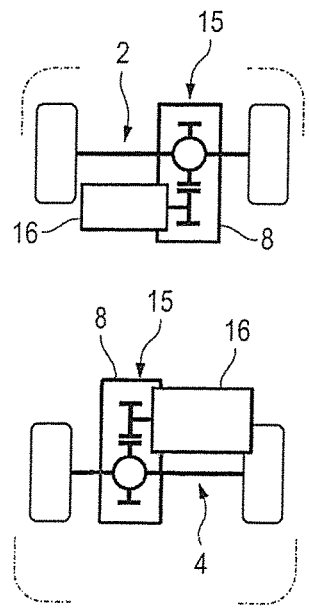

The drive train of FIG. 5 is modified in relation to FIG. 1 in that, given an identical design of the drive train 6 of the front axle 2, the drive train 6 of the rear axle 4 also has only one electrical machine 16 connected to the housing 8 of the gear mechanism 15. However, the electrical machine 16 is on the left side and the gear mechanism 15 is on the right side in the region of the front axle 2, while the electrical machine 16 is on the right side and the gear mechanism 15 is on the left side in the region of the rear axle 4. The two electrical machines 16 are arranged between the axles 2 and 4. The same housing 8 is used again in FIG. 5, but different electrical machines 16 can be flange-connected to the housing. Therefore, the machine connection dimensions in the region of the electrical machine/gear mechanism interface are the same. As a result, different sizes of machine and types of machine can be used for power and function adjustment. For example, it is possible to choose the type of motor, for example an asynchronous machine or a permanent-magnet synchronous machine.

Figure 6:
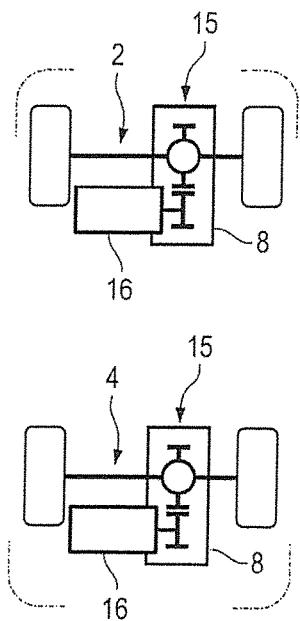
Figure 7:
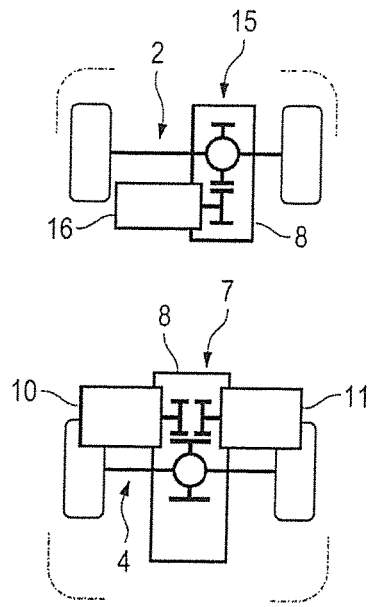

FIG. 6 shows the configurations of the two drive trains of the motor vehicle for achieving symmetrical power distribution, when the same housing 8 is used. FIG. 7 shows the modification to the effect that asymmetrical power distribution takes place.

Figure 8:
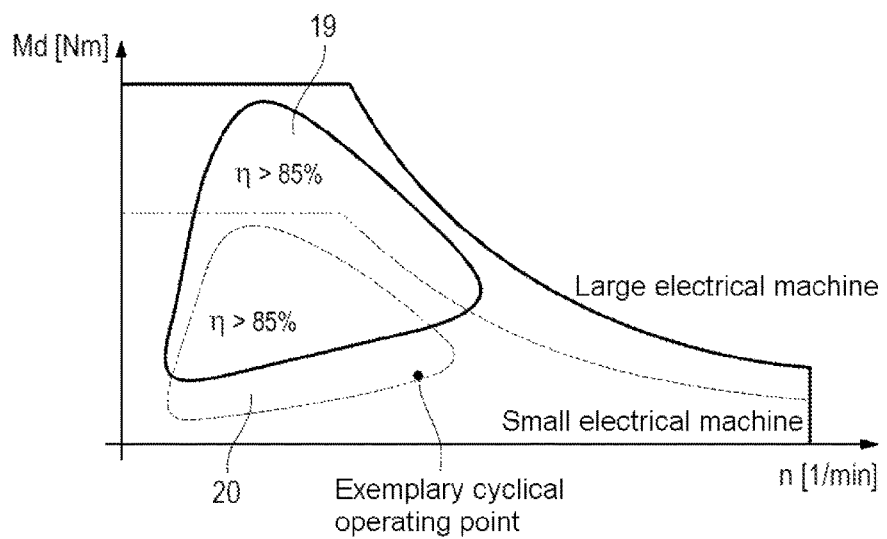
FIG. 8 shows the influence of different sizes of electrical machines used in the drive train in a torque/rotation speed graph.

The graph of FIG. 8 shows the influence of the size of the used electrical machine in terms of the torque that is output by the electrical machines, as a function of the rotation speed of the machine. The graph shows that the region of a high degree of efficiency in the characteristic maps for the degree of efficiency of the large electrical machine and the small electrical machine. The characteristic map 19 for the degree of efficiency of the large permanent-magnet synchronous machine and the characteristic map 20 for the efficiency of the small permanent-magnet synchronous machine overlap. Advantages in the degree of efficiency are produced in cyclical operation due to a relatively small electrical machine with the option of turning off or decoupling the machine.

Figure 9:
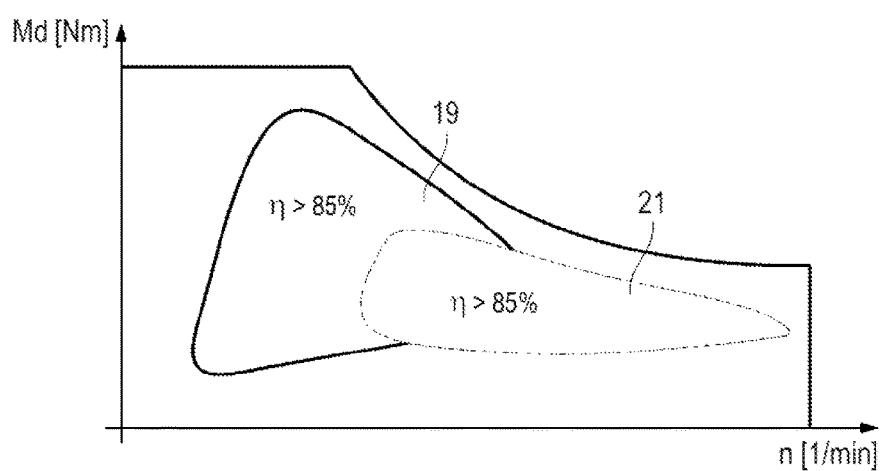
FIG. 9 shows the influence of different types of electrical machines used in the drive train in a torque/rotation speed graph.

In a corresponding diagram, FIG. 9 shows the influence of the type of machine. The characteristic map 19 for the degree of efficiency of the permanent-magnet synchronous machine and the characteristic map 21 for the degree of efficiency of the asynchronous machine. In cyclical operation, advantages with respect to the degree of efficiency are produced by the combination of these different types of electrical machine and the changeover between the types of electrical machine as a function of the speed or load range. It is also possible to switch off or decouple a machine.

Figure 10:
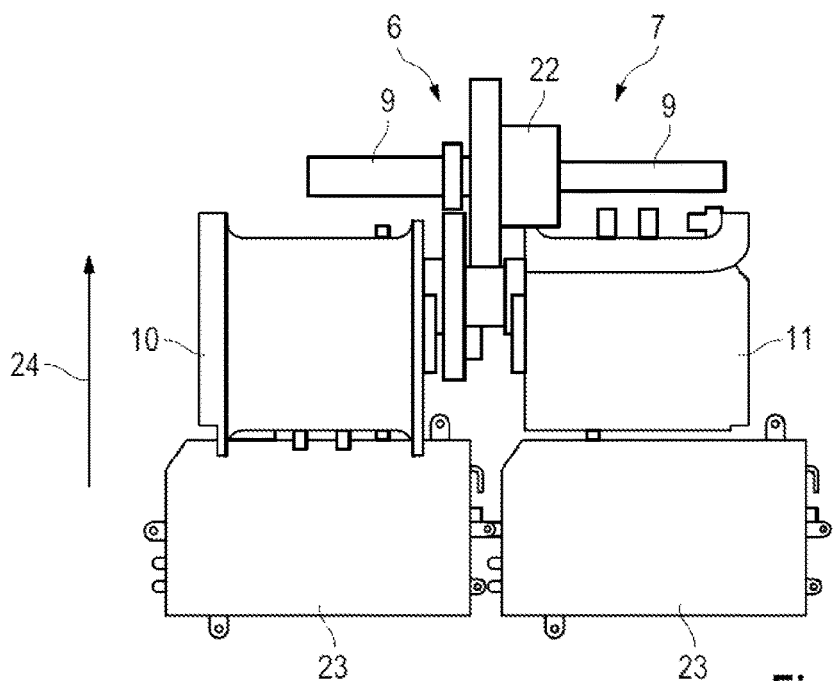
FIG. 10 is an embodiment of the drive train when the gear mechanism is a summing gear mechanism, as seen from above.
Figure 11:
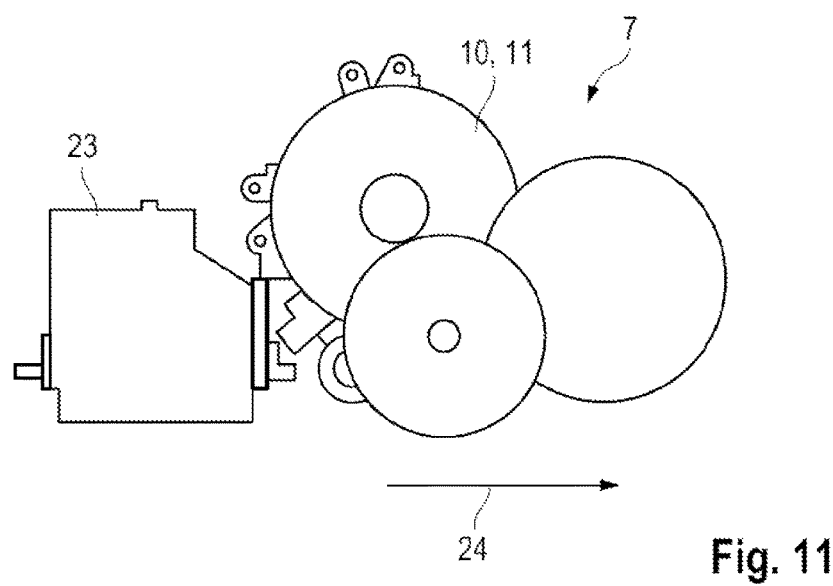
FIG. 11 shows the drive train of FIG. 10, as seen in the direction of the vehicle axle.

FIGS. 10 and 11 show one possible configuration of the gear mechanism 7, which is a summing gear mechanism. The gear mechanism 7 is a two-stage gear mechanism. The gear mechanism 7 is of three-shaft design with an intermediate shaft. The two electrical machines 10 and 11 interact with the gear mechanism 7. A mechanical differential 22 is associated with the output drive of the gear mechanism 7. The figure does not illustrate a decoupling device, which is associated with the gear mechanism 7, for decoupling one of the two electrical machines 10, 11. Reference numeral 23 denotes the power electronics associated with an electrical machine 10 or 11.

The configuration of the drive train 6 illustrated in FIGS. 10 and 11 allows a compact gear mechanism 7 to be formed in the center of the vehicle, with respect to an orientation transverse to the forward direction 24 of travel of the motor vehicle which is illustrated by the arrow. An efficient tooth system is possible with two gear wheel stages. The drive train can also be operated by one machine. To this end, the machine is decoupled by the decoupling device if the machine is in the form of an asynchronous machine. If the machine is in the form of a permanent-magnet synchronous machine, the decoupling device is not required. Immersion lubrication preferably is used in the gear mechanism 7, and therefore an oil pump is not required.

What is claimed is:

1. A drive train of a motor vehicle that can be driven in a purely electric manner, the motor vehicle having a front axle and a rear axle and opposite first and second lateral sides, the drive train comprising:

a front gear mechanism having a front housing, a front electrical machine located between the front and rear axles and being flange mounted to the front housing at a position between the front housing and the first lateral side of the motor vehicle, no electrical machine being mounted to the front housing at a position between the front housing and the second lateral side of the motor vehicle, and two front gear mechanism output shafts extending from the front housing and associated with the front axle; and a rear gear mechanism having a rear housing, a rear electrical machine located between the front and rear axles and being flange mounted to the rear housing at a position between the rear housing and the second lateral side of the motor vehicle, no electrical machine being mounted to the rear housing at a position between the rear housing and the first lateral side of the motor vehicle, and two rear gear mechanism output shafts extending from the rear housing and associated with the rear axle, wherein the front housing and the rear housing are identical but are reversed relative to one another in a front-rear direction, wherein a size of the front electrical machine is different from a size of the rear electrical machine, and wherein a first of the electrical machines is an asynchronous machine and a second of the electrical machines is a permanent-magnet synchronous machine.

2. The drive train of claim 1, wherein the gear mechanism is a summing gear mechanism.

3. The drive train of claim 1, wherein at least one of the front and rear gear mechanisms is connected to an electrical machine of high power, or two electrical machines of low power, or an electrical machine of high power and an electrical machine of low power.

4. The drive train of claim 1, wherein the gear mechanism has two separate gear mechanism units having the two gear mechanism output shafts for a single-wheel drive of the road wheels.

5. The drive train of claim 4, wherein identical electrical machines are connected to the gear mechanism units in each case.

6. The drive train of claim 1, wherein each of the respective electrical machines has a rotor shaft arranged transverse to a forward direction of travel of the motor vehicle.

7. The drive train of claim 1, wherein each of the respective gear mechanism output shafts is arranged transverse to a forward direction of travel of the motor vehicle.

8. The drive train of claim 1, wherein the gear mechanism is in a central region of the motor vehicle with respect to a width of the motor vehicle.

9. The drive train of claim 1, comprising two electrical machines and the gear mechanism are between the electrical machines.

10. The drive train of claim 1, wherein at least one of the gear mechanisms is a two-stage gear mechanism.

11. The drive train of claim 10, wherein at least one of the gear mechanisms is of three-shaft design with an intermediate shaft.

12. The drive train of claim 10, wherein at least one of the gear mechanisms has a first stage of planetary design and a second stage of spur-gear design.

13. The drive train of claim 1, wherein at least one of the gear mechanisms has a decoupling device for decoupling at least one of the electrical machines.

14. The drive train of claim 1, wherein the front housing is closer to the second lateral side of the vehicle than to the first lateral side of the vehicle, and the rear housing is closer to the first lateral side of the vehicle than to the second lateral side of the vehicle.

* * * * *